(12) United States Patent
Perez et al.

(10) Patent No.: US 11,610,075 B2
(45) Date of Patent: Mar. 21, 2023

(54) HIERARCHICAL RULE CLUSTERING

(71) Applicant: Hewlett Packard Enterprise Development LP, Houston, TX (US)

(72) Inventors: David Subiros Perez, Bristol (GB); Luis Miguel Vaquero Gonzalez, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 1224 days.

(21) Appl. No.: 16/085,187

(22) PCT Filed: Apr. 29, 2016

(86) PCT No.: PCT/US2016/030099
§ 371 (c)(1),
(2) Date: Sep. 14, 2018

(87) PCT Pub. No.: WO2017/188987
PCT Pub. Date: Nov. 2, 2017

(65) Prior Publication Data
US 2020/0265264 A1    Aug. 20, 2020

(51) Int. Cl.
*G06K 9/62*    (2022.01)
*G06N 5/02*    (2006.01)
*G06N 5/025*    (2023.01)

(52) U.S. Cl.
CPC ......... *G06K 9/6219* (2013.01); *G06K 9/6215* (2013.01); *G06N 5/025* (2013.01)

(58) Field of Classification Search
None
See application file for complete search history.

(56) References Cited

U.S. PATENT DOCUMENTS

| | | | |
|---|---|---|---|
| 6,996,553 B2 | 2/2006 | Agrawal et al. | |
| 7,337,230 B2 | 2/2008 | Zehavi | |
| 2014/0100821 A1 | 4/2014 | Leonard | |
| 2019/0098039 A1* | 3/2019 | Gates | G16H 20/70 |
| 2019/0370914 A1* | 12/2019 | Anagnostos | G05B 15/02 |

FOREIGN PATENT DOCUMENTS

JP    S6425243 A    1/1989

OTHER PUBLICATIONS

Serpen et al. ("Measuring similarity in feature space of knowledge entailed by two separate rule sets"), Knowledge based system, vol. 19 Issue 1, Mar. 2006 (Year: 2006).*

(Continued)

*Primary Examiner* — Randolph I Chu
(74) *Attorney, Agent, or Firm* — Sheppard Mullin Richter & Hampton LLP

(57) ABSTRACT

Example embodiments relate to hierarchical rule clustering. The examples disclosed herein access information about a set of rules, where information for an individual rule comprises information about a set of hypershapes associated with the individual rule. A respective hypervolume for each set of hypershapes associated with each individual rule may be calculated based on the accessed information. A first rule and a second rule may be combined as a new individual rule in the set of rules based on overlaps between the calculated hypervolumes.

12 Claims, 3 Drawing Sheets

(56) References Cited

OTHER PUBLICATIONS

Agrawal et al., "Automatic Subspace Clustering of High Dimensional Data for Data Mining Applications", 1998, 12 pages.
International Search Report and Written Opinion received for PCT Application No. PCT/US2016/30099, dated Jan. 26, 2017, 13 pages.
N. Takagi. An agglomerative hierarchical clustering by finding adjacent hyper-rectangles. Rough Sets and Current Trends in Computing, 2006—Springer.
Hahsler, M., et al.; "Visualizing Association Rules in Hierarchical Groups"; May 29, 2011; 11 pages.
Han, W., et al.; "A Clustered Dynamic Point Split Algorithm for Packet Classification"; Jul. 25, 2013; pp. 1342-1347.
Hasperue, W., et al.; "Rule Extraction on Numeric Datasets Using Hyper-rectangles"; Computer and Information Science; vol. 5, No. 4; pp. 116-131; 2012 (http://www.ccsenet.org/journal/index.php/cis/article/view/15766) See pp. 124-127; and figures 1 and 4.
Liu, B., et al.; "ost-Analysis of Learned Rules"; In: Proceedings of AAAI-96; pp. 828-834; 1996; (http://citeseerx.ist.psu.edu/viewdoc/summary?doi=10.1.1.604.8738) See pp. 830-832 and figures 1-2.
Monk, T. J., et al.; "Geometric Comparison of Classifications and Rule Sets"; In: Proceedings of AAAI-94 workshop on knowledge discovery in databases; AAAI Technical Report WS-94-03; pp. 395-406; 1994; (http://www.aaai.org/Papers/Workshops/1994/WS-94-03/WS94-03-034.pdf) See pp. 400 and 403.
Serpen, G., et al.; "Measuring similarity in feature space of knowledge entailed by two separate rule sets"; Knowledge-Based Systems, vol. 19, No. 1,pp. 67-76, Mar. 2006 See abstract; pp. 68-70 and 73; and figures 3-4.
Sethi, P., et al.; "Association Rule Based Similarity Measures for the Clustering of Gene Expression Data"; May 28, 2010; 19 pages.

\* cited by examiner

HIERARCHICAL RULE CLUSTERING

CROSS REFERENCE TO RELATED APPLICATIONS

This application is a continuation of, and claims the priority benefit of, International Patent Application No. PCT/US2016/030099 filed Apr. 29, 2016, International Publication No. WO2017/188987, published on Nov. 2, 2017 the contents of which is incorporated herein by reference in its entirety.

BACKGROUND

Many business and technical processes apply "if condition, then action" rules. The "if-then" conditional statements are widely used across many programming conventions. Creating and managing a system of conditional rules can be a major undertaking as the number of rules grows and the interactions between rules subsequently multiply.

BRIEF DESCRIPTION OF THE DRAWINGS

The following detailed description references the drawings, wherein.

DETAILED DESCRIPTION

Figure 1:
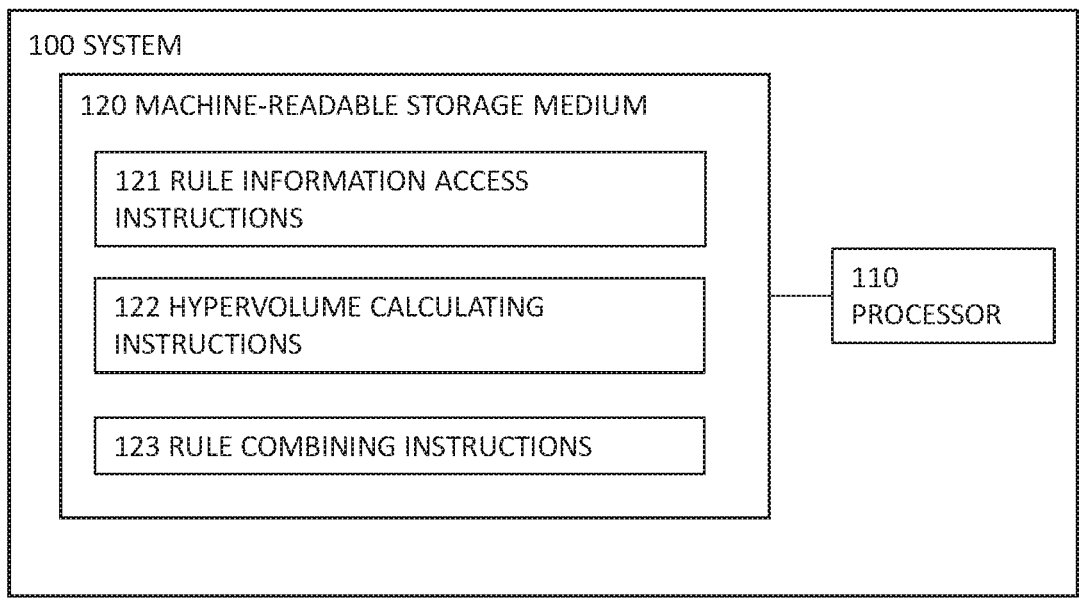
FIG. 1 is a block diagram of an example system for hierarchical rule clustering.

"If condition, then action" rules are widely used by business processes, IT management systems, as well as lower level systems like firmware for microprocessors, Network Function Virtualization (NFV) orchestrators, or Firewalls. With the rapid expansion in the use of computer systems and networks to host both business and consumer applications, the complexity of processes have also multiplied as more and more industries are relying on softwarized IT infrastructures. As a result, rule sets tend to keep on growing as systems evolve.

As rules become more numerous and complex, they can become more challenging to create, manage, or understand especially when many variables are involved. In some examples where rules may not be effectively managed, systems may end up containing redundant, contradictory, or obsolete rules. Rules may be redundant in that they cover a same logical space and the action that the rule enforces may be compatible or well prioritized with other rules in the same logical space. On the other hand, rules may be contradictory when they cover the same logical space, where they enforce contradictory actions, and no or indefinite priority is defined. Furthermore, as managed systems may be dynamic, some situations that are covered by a rule may no longer occur or its effects are nonconsequential, therefore causing the rule to become obsolete. It may be challenging to detect obsolescence of rules, and even more difficult to delete obsolete rules with the confidence that no side effects will happen, as existing lower priority rules may be triggered in some scenarios that were previously covered by obsolete rules. When editing a rule, the logical area covered by it may change, hence the same issues may arise.

Furthermore, rule sets usually keep growing, as more situations are detected and rules are created to handle them. Often, rules may be created by different users and at different points in time, and they may cover the same logical space but handle different higher or lower level situations. Hence it is difficult to forecast interactions between rules, and conflicts can easily happen. These scenarios are considered by rule administrators when managing rule sets.

Further, it also may be technically challenging for an administrator or system that wants to find or group similar rules to determine how to do so based on their semantic similarity. An administrator may need to manually check every rule in a system, label rules based on their knowledge of what the rule covers, and so forth. This time consuming process may have accuracy issues, may not be scalable (especially for rules with multiple variables or high dimensionality, and would require consistent updating and correction.

Examples disclosed herein address these technical challenges by facilitating pre-calculated hierarchical clustering of rules based on rule intersection. With hierarchical clustering of rules based on rule intersection, rules could be grouped based on semantics and new rules could be added to pre-existing clusters of combined rules. Hierarchical clustering of rules could be iteratively performed on all rules or sets of rules in a system to group rules based on semantics or other factors.

In particular, examples disclosed herein address these technical challenges by facilitating hierarchical rule clustering. For example, a system comprising a physical processor implementing machine readable instructions may facilitate hierarchical rule clustering. Information about a set of rules may be accessed, where information for an individual rule comprises information about a set of hypershapes associated with the individual rule. A respective hypervolume may be calculated for each set of shapes associated with each individual rule. The hypervolume may be calculated based on the accessed information. A first rule and second rule may be combined as a new individual rule in the set of rules based on overlaps between the calculated hypervolumes.

Hierarchical rule clustering could allow rule administrators to have an overview of the logical coverage of the system, with the option to drill down until specific rules are reached. Further, rule administrators may be able to classify rules according to their logical overlap. Additionally, algorithms that need to check overlap between rules at runtime can use a pre-calculated clustering of rules to be more computationally efficient (e.g., only iterating to subclusters of combined rules as needed). Hierarchical rule clustering also provides an overview of the logical coverage of a rule set of a space, which can be useful to administrators, users, developers, and others.

Referring now to the drawings, FIG. 1 depicts an example system 100 for hierarchical rule clustering. System 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 1, system 100 includes a hardware processor 110 and a non-transitory machine-readable storage medium 120 encoded with instructions to hierarchically cluster rules.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 121, 122, 123, and/or other instructions to implement the procedures described herein. As an alternative or in addition to retrieving and executing instructions, processor 110 may include one or more electronic circuits that include electronic components for performing the functionality of one or more of instructions 121, 122, and 123.

In an example, the program instructions 121, 122, 123, and/or other instructions can be part of an installation package that can be executed by processor 110 to implement the functionality described herein. In such a case, memory 120 may be a portable medium such as a CD, DVD, or flash drive or a memory maintained by a computing device from which the installation package can be downloaded and installed. In another example, the program instructions may be part of an application or applications already installed on system 100.

Machine-readable storage medium 120 may be any electronic, magnetic, optical, or other physical storage device that contains or stores executable data accessible to system 100. Thus, machine-readable storage medium 120 may be, for example, a Random Access Memory (RAM), an Electrically Erasable Programmable Read-Only Memory (EEPROM), a storage device, an optical disc, and the like. Storage medium 120 may be a non-transitory storage medium, where the term "non-transitory" does not encompass transitory propagating signals. Storage medium 120 may be located in system 100 and/or in another device in communication with system 100. As described in detail below, machine-readable storage medium 120 may be encoded with rule information access instructions 121, hypervolume calculating instructions 122, and rule combining instructions 123.

Rule information access instructions 121, responsive to being executed by processor 110, may access information about a set of rules, wherein information for an individual rule comprises information about a set of hypershapes associated with the individual rule. In some examples, the set of hypershapes may have been previously determined for each rule as described in co-pending patent application no. PCT/US2016/030087, filed Apr. 29, 2016, titled "HYPERSHAPES FOR RULES WITH DIMENSIONS DEFINED BY CONDITIONS", and incorporated herein by reference in its entirety.

The non-transitory storage medium 120, another storage medium communicably coupled to system 100, and/or another computing device communicably coupled to system 100 may comprise the information about the set of rules. Instructions 121 may access the information about the set of rules responsive to a prompt by an administrator to organize rules, responsive to addition of a new rule, responsive to a change in a rule or a predetermined threshold amount of changes for rules in the system, and/or based on other conditions. Instructions 121 may store the accessed information in the non-transitory storage medium 120.

In some examples, the information about the set of hypershapes associated with each rule may comprise a size, a relative position, volume, edge, side, number of dimensions, and/or other information about each hypershape in the set of hypershapes. In some examples, the information about each set of hypershapes may also include a Jaccard similarity of the set of hypershapes. In some examples, instructions 121 may construct a N-dimensional hyperspace graph based on the accessed information, such that each set of hypershapes is positioned on the graph to represent the rule associated with the set of hypershapes in the N-dimensional space.

In some examples, and as described above, the accessed information may be determined as described in co-pending patent application no. PCT/US2016/030087, filed Apr. 29, 2016, titled "HYPERSHAPES FOR RULES WITH DIMENSIONS DEFINED BY CONDITIONS." As a related illustration, instructions 121 may implement example block 310 of method 300 of FIG. 3 to access information about the set of rules.

Based on accessed information, hypervolume calculating instructions 122 may calculate a respective hypervolume for each set of hypershapes associated with each individual rule. In some examples, the calculated hypervolume may comprise the number of elements in the set of hypershapes. In some examples, instructions 122 may calculate a hypervolume of a set of hypershapes by dividing a number of elements in a hypershape in a particular dimension by the total number of possible elements in that dimension. This type of calculation helps to ensure that each dimension has the same weight, by normalizing the calculated hypervolume. Instructions 122 may store the calculated hypervolumes for each set of hypershapes associated with each rule. For example, instructions 122 may store the calculated hypervolumes in the non-transitory storage medium 120 or another storage medium communicably coupled to system 100. Instructions 122 may implement example block 320 of method 300 of FIG. 3 to calculate, based on the accessed information, a respective hypervolume for each set of hypershapes associated with each individual rule.

Instructions 122 may determine, for each pair of rules in the set of rules, a respective pair overlap between calculated hypervolumes for each individual rule. In some examples, instructions 122 may determine the respective pair overlap by determining a respective Jaccard similarity for the respective sets of hypershapes associated with each pair of rules. In examples where the calculated hypervolumes are normalized, instructions 122 may determine the respective pair overlap between normalized hypervolumes for each individual rule.

A Jaccard similarity between a first rule and a second rule may be calculated, for example, by determining a hypervolume of an intersection of a first set of hypershapes associated with the first rule and a second set of hypershapes associated with the second rule divided by a hypervolume of a union of the first set of hypershapes and a second set of hypershapes. In other words, a Jaccard similarity may divide an intersection of the first and second set of hypershapes with a union of the first and second set of hypershapes. An example formula for the Jaccard similarity between the first rule (R1) and second rule (R2) may be: $J(1, 2) = \text{vol}(R1 \text{ and } R2) / \text{vol}(R1 \text{ or } R2)$.

Figure 4:
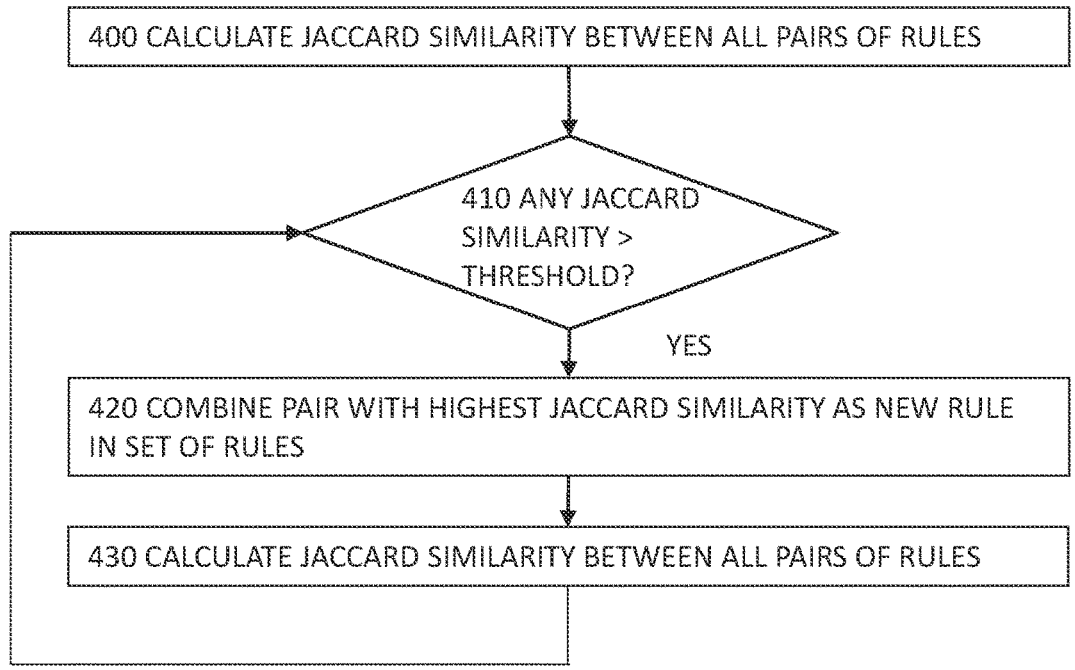
FIG. 4 is flowchart of an example method for hierarchical rule clustering.
Figure 5:
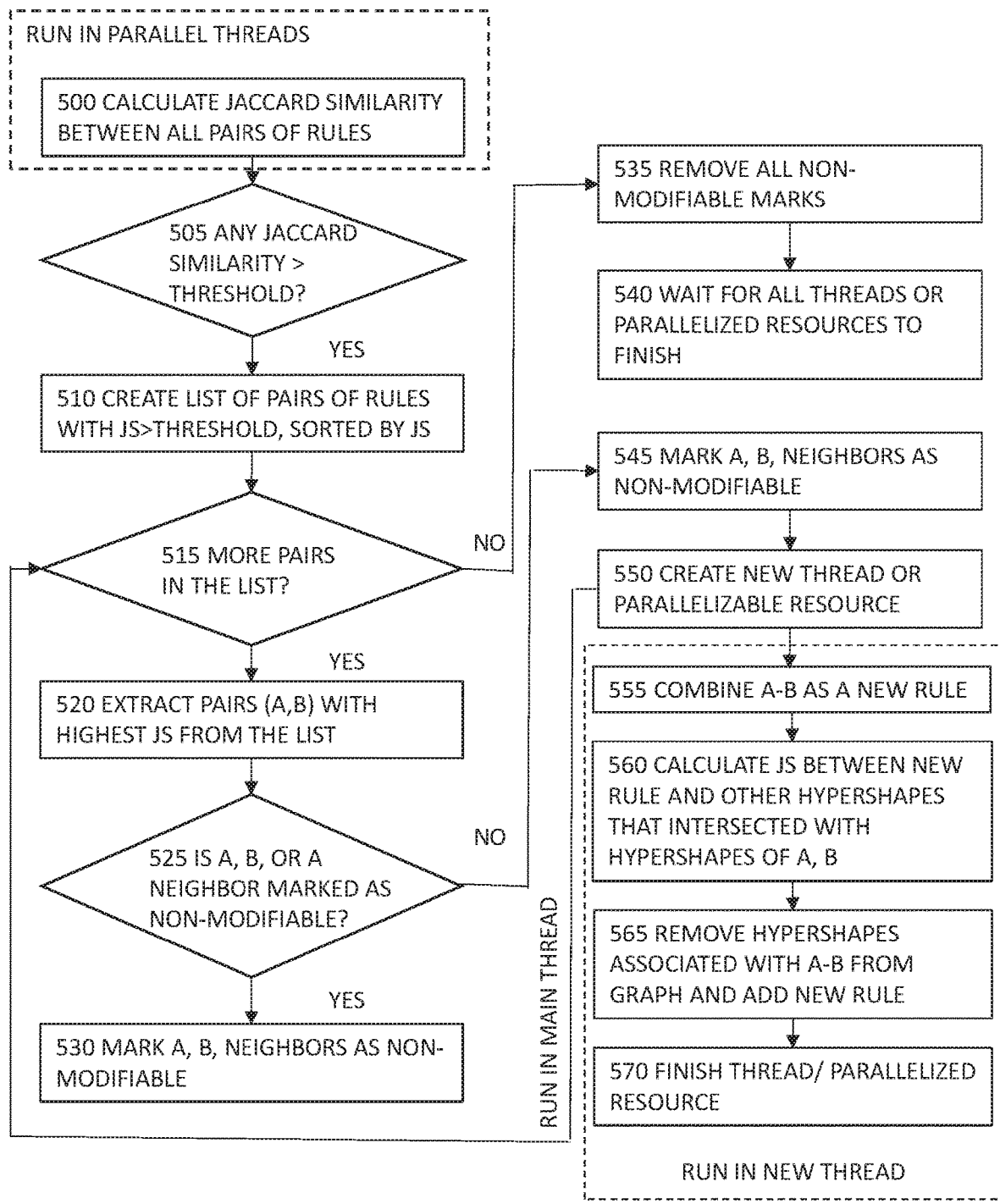
FIG. 5 is flowchart of an example method for hierarchical rule clustering.

Details of example implementations of block 320 by instructions 122 is illustrated in the example method of FIG. 4, and the example method of FIG. 5. FIG. 4 depicts an example method to iteratively calculate hypervolumes, determine pair overlaps of sets of hypershapes associated with rules, and combine rules based on the determined overlaps. FIG. 5 also depicts an example method to iteratively calculate hypervolumes, determine pair overlaps of sets of hypershapes associated with rules, and combine rules based on the determined overlaps but does so while incorporating parallelization of implementation (using concurrent threads to implement the method). The implementation of instructions 122 is described with reference to those figures.

Instructions 122 will first be described in conjunction with FIG. 4. In some examples, upon calculating the hypervolumes for each set of hypershapes associated with each rule in the accessed information, instructions 122 may calculate a Jaccard similarity between all pairs of rules in the set of rules by implementing block 400 of the method of FIG. 4.

In some examples, instructions 122 may calculate a Jaccard similarity using the above described example formula. Instructions 122 may save the Jaccard similarities between each pair in a table, in a cache of system 100, with information already saved about each set of hypershapes and/or the set of rules, at the non-transitory storage medium 120, and/or in another manner.

In an example with parallel execution of threads to implement hierarchical rule clustering, instructions 122 may implement block 500 of FIG. 5 to calculate Jaccard similarities between all pairs of rules in the set of rules. In some examples, FIG. 5 may be implemented on a main thread and may cause spawning of multiple other threads to run in parallel in order to more efficiently hierarchically cluster rules. For example, instructions 122 may calculate a Jaccard similarity between all pairs of rules in the set of rules. Instructions 122 may calculate Jaccard similarity in a manner similar to or the same as described with relation to FIG. 4. In FIG. 5, however, instructions 122 may calculate Jaccard similarity between each pair of rules via multiple threads. Instructions 122 may use a separate thread to calculate Jaccard similarities between each pair of rules or may calculate multiple Jaccard similarities on a single thread (e.g., via a ratio of calculations per thread). The number of threads spawned for parallel processing as described herein is an example and should not be considered as limiting the amount or usage of threads.

Continuing to refer to FIG. 1, rule combining instructions 123, responsive to being executed by processor 110, may combine a rule pair (e.g., a first rule and a second rule) as a new rule in the set of rules based on overlaps between the calculated hypervolumes. For example, responsive to determining that a first pair overlap between a first pair of rules is the highest determined overlap, instructions 123 may combine the first rule and the second rule as a new individual rule in the set of rules. Instructions 123 may combine the first rule and the second rule by combining the respective sets of hypershapes associated with the first rule and the second rule.

As described above, in some examples, the pair overlap between a pair of rules is determined by determining a Jaccard similarity between the pair of rules. In these examples, instructions 123 may combine a first rule and a second rule with the highest determined Jaccard similarity of all of the Jaccard similarities calculated by implementing instructions 122.

In some examples, like the example method described in FIG. 4, instructions 123 may combine a pair of rules with the highest Jaccard similarity as a new rule in the set of rules, replacing the two individual rules that were combined. Instructions 123 may first determine whether any Jaccard similarities between pairs are greater than a threshold. For example, instructions 123 may implement block 410 of FIG. 4 as well to determine whether a Jaccard similarity between a pair of rules is greater than a threshold. The threshold may be zero, may be machine-learned, may be provided by an administrator of system 100, and/or may be otherwise determined. Responsive to the Jaccard similarity being higher than the threshold, instructions 123 may implement block 420 to combine the pair with the highest Jaccard similarity as a new rule in the set of rules.

As shown in FIG. 4, this process may be iterative until no Jaccard similarity that has been calculated between pairs of rules is greater than the threshold. As such, responsive to combining the pair with the highest Jaccard similarity, a new Jaccard similarity between all pairs of rules in the set of rules (including the newly combined rule) may be calculated, and then Jaccard similarities for each rule pair may be compared against the threshold to see if another iteration of the method should be performed. As such, instructions 123 may calculate new hypervolumes for each set of hypershapes associated with each individual rule in the set of rules, and another pair of rules (e.g., a third rule and a fourth rule) may be combined based on the new overlaps between the calculated new hypervolumes. In contrast, responsive to all Jaccard similarities being below the threshold, instructions 123 may not combine any rule pairs (or any respective sets of hypershapes associated with individual rules).

In this iterative process, information may be stored about Jaccard similarities calculated for each set of rules, and the orders in which rules are combined. As such, in addition to information about which rules are combined as pairs, information may be stored in a tree structure or other hierarchical structure to show an order by which rules are combined. For example, a hierarchical structure may comprise nodes in an order that indicates that rules R1 and R3 were combined first, rules R13 and R2 were combined second, and then rules R123 and R4 were combined. With each node, information about the sets of hypershapes combined, the individual rules combined, the hypervolumes calculated for each rule, the calculated Jaccard similarities, and/or other information may be stored.

In some examples, this hierarchical structure may be created and updated as the iterative process is being performed, with information about the Jaccard similarities and calculated hypervolumes being stored at each node and calculated for each updated set of rules based on that stored information. By using the information stored at each node, new hypervolumes for the combined rules do not need to be calculated from scratch; rather, the stored hypervolumes and information used to calculate the Jaccard similarities for that node may be used to calculate new hypervolumes and new Jaccard similarities.

As described above, a Jaccard similarity may be calculated by dividing an intersection of the first and second set of hypershapes with a union of the first and second set of hypershapes. An example formula for the Jaccard similarity between the first rule (R1) and second rule (R2) may be: J(1, 2)=vol(R1 and R2)/vol(R1 or R2). In the example described above where rules R13 and R2 were described, if the hypervolumes of R13 and R2 were stored at each node, determining the Jaccard similarity would be much easier and more efficient than recomputing the hypervolumes for the combination of R1 and R3 and also R2.

As mentioned above, FIG. 5 also provides an example iterative method for hierarchical rule clustering using parallel execution of threads. As mentioned above with respect to instructions 122, a main thread may be executing in FIG. 5, as well as multiple additional spawned threads in order to facilitate parallel execution of blocks described in FIG. 5.

After Jaccard similarities have been calculated between all pairs of rules via multiple threads (e.g., by instructions 122 implementing block 500 of the example method of FIG. 5), instructions 123 may implement block 505 of FIG. 5 to determine whether any of the Jaccard similarities are greater than a threshold. This determination may be the same as or similar to the determination described above with respect to instructions 123 and FIG. 4. In some examples, this determination may be executed on the main thread executing the example method of FIG. 5.

Responsive to no Jaccard similarities being greater than the threshold, no more pairs of rules may be combined.

Responsive to any of the Jaccard similarities being greater than the threshold, instructions 123 may implement block 510 of FIG. 5 to create a list of pairs of rules with a Jaccard similarity greater than the threshold. Responsive to the list of pairs including at least one pair (e.g., with instructions 123 implementing block 515 of FIG. 5), instructions 123 may implement block 520 of FIG. 5 to extract a pair of rules A, B with the highest Jaccard similarity in the sorted list. Instructions 123 may then implement block 525 of FIG. 5 to determine whether A, B, or a neighbor (e.g. a rule that overlaps with A or B) is marked as non-modifiable. Rules and neighbors are marked as non-modifiable to ensure that rules are combined in a consistent manner, without changes to the sets of hypershapes associated with each rule.

Responsive to A, B, or a neighbor being marked as non-modifiable, instructions 123 may implement block 530 to mark A, B, and their neighbors as non-modifiable. Responsive to A, B, and their neighbors not being marked as non-modifiable, instructions 123 may implement block 545 mark A, B, and their neighbors as non-modifiable and may then iteratively continue the process to determine if more pairs are in the sorted list of Jaccard similarities in the main thread that is performing the example method of FIG. 5. Instructions 505, 510, 515, 520, 525, and 530 may be performed by the main thread of FIG. 5 and/or by another thread spawned to run concurrently with the main thread.

Instructions 123 may also implement block 550 to create a new thread or parallelizable resource to perform blocks 555 to 570. For example, in the separate thread, instructions 123 may implement block 555 to combine rules A and B as a new rule. Instructions 123 may implement block 560 to calculate Jaccard similarities between the new rule and the other rules that intersected with rules A and B. Instructions 123 may also implement block 565 remove the hypershapes associated with previous rules A and B from the graph and or information about the set of rules, and may add the new rule.

Instructions 123 may then implement block 570 to finish or close the separate thread. As part of or in response to finishing or closing the separate thread, instructions 123 may remove the marks of non-modifiable from any marked rules and may then indicate to the main thread that it may move to the next iteration. The main thread of FIG. 5 may wait until all concurrent threads finish their execution to begin another iteration and determine whether additional pairs of rules exist in the sorted list of rules generated by block 510 of FIG. 5

Figure 2:
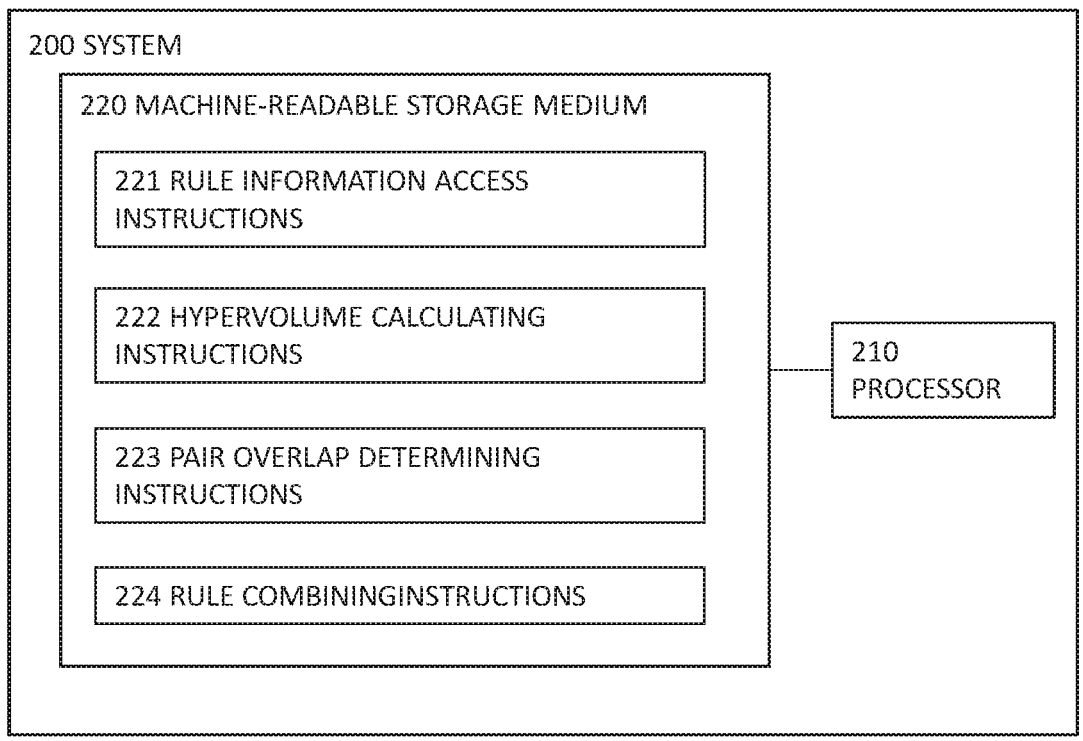
FIG. 2 is a block diagram of a non-transitory machine-readable storage medium of a second example system for hierarchical rule clustering.

FIG. 2 depicts a non-transitory machine-readable storage medium 200 of a second example system for hierarchical rule clustering. Similar to system 100, the second computing device may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. Non-transitory machine-readable storage medium 200 may be encoded with instructions for hierarchical rule clustering.

The second computing device may also include a processor, which may be one or more central processing units (CPUs), semiconductor-based microprocessors, and/or other hardware devices suitable for retrieval and execution of instructions stored in machine-readable storage medium 200. The processor may fetch, decode, and execute instructions 221, 222, 223, 224, and/or other instructions to implement the procedures described herein.

Rule information access instructions 221 may be analogous to instructions 121 of system 100, and may access information about a set of rules, where information for an individual rule comprises information about a set of hypershapes associated with the individual rule. Hypervolume calculating instructions 222 may be analogous to instructions 122 of system 100, and may calculate, based on the accessed information, a respective hypervolume for each set of hypershapes associated with each individual rule. Pair overlap determining instructions 223 may be analogous to parts of instructions 123 and may determine, based on the calculated respective hypervolumes, a respective pair overlap for each pair of rules in the set of rules. Furthermore, rule combining instructions 224 may be analogous to instructions 123 of system 100, and may combine, based on determined pair overlaps, a first rule and a second rule as a new individual rule in the set of rules. The methods of FIGS. 3, 4 and 5 could be implemented by system 200 as well as system 100.

Figure 3:
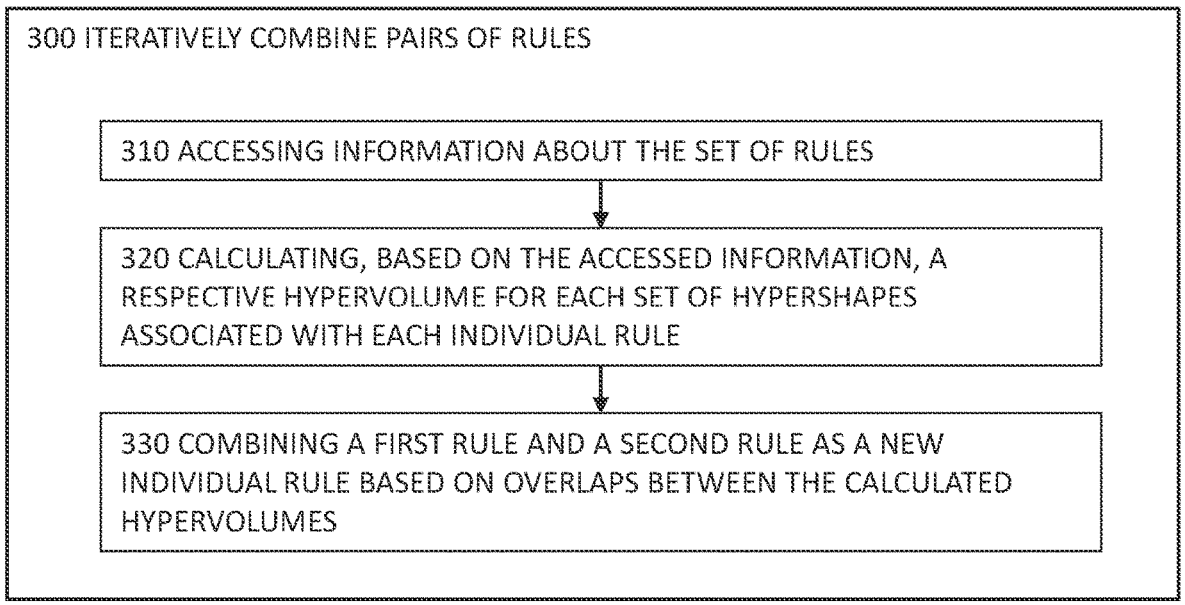
FIG. 3 is a flow chart of an example method for hierarchical rule clustering.

FIG. 3 is a flow chart of an example method for hierarchical rule clustering. FIG. 3 was described previously in relation to FIG. 1.

FIG. 4 is an example method for hierarchical rule clustering and was described previously in relation to FIG. 1.

FIG. 5 is an example method for hierarchical rule clustering, and was described previously in relation to FIG. 1.

The foregoing disclosure describes a number of example embodiments for hierarchical rule clustering. The disclosed examples may include systems, devices, computer-readable storage media, and methods for hierarchical rule clustering. For purposes of explanation, certain examples are described with reference to the components illustrated in FIGS. 1-5. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following

What is claimed is:

1. A system for hierarchical rule clustering, comprising a physical processor that implements machine readable instructions that cause the system to:
   determine one or more sets of hypershapes associated with a first the individual rule, wherein each set of the one or more sets of hypershapes associated with the first rule includes a set of dimensions corresponding to each variable of the first rule;

determine one or more sets of hypershapes associated with a second rule, wherein each set of the one or more sets of hypershapes associated with the second rule comprises a set of dimensions corresponding to each variable of the second rule;

generate a first hypervolume for each set of hypershapes associated with each variable of the first rule;

generate a second hypervolume for each set of hypershapes associated with each variable of the second rule;

generate a first graphical representation of the first hypervolume and a second graphical representation of the second hypervolume;

determine an intersection of the first graphical representation and second graphical representation, the intersection comprising a variable of the first rule and a variable of the second rule, wherein the variable of the first rule and the variable of the second rule are equal;

combine, based on the intersection of the first hypervolume and the second hypervolume, the first rule and the second rule to determine a new individual rule; and generate a new hypervolume comprising the new individual rule.

2. The system of claim 1, wherein the physical processor implements machine readable instructions that cause the system to:

determine the intersection between the first hypervolume and second hypervolume by:

determining a respective Jaccard similarity for each set of the one or more sets of hypershapes associated with each respective rule.

3. The system of claim 2, wherein the physical processor implements machine readable instructions that cause the system to:

responsive to a Jaccard similarity being below a threshold, not combine each set of the one or more sets of hypershapes associated with each respective rule.

4. The system of claim 1, wherein the physical processor implements machine readable instructions that cause the system to:

normalize the first hypervolume and second hypervolume; and determine, for each rule, an intersection between the first hypervolume and second hypervolume.

5. A method of hierarchical rule clustering, the method being implemented by a computer system comprising a physical processor implementing machine readable instructions, the method comprising:

iteratively combining pairs of rules in a set of rules by:

determining one or more sets of hypershapes associated with a first rule and second rule;

generating a first hypervolume for each set of hypershapes associated with each variable of the first rule;

generating a second hypervolume for each set of hypershapes associated with each variable of the second rule;

generating a first graphical representation of the first hypervolume and a second graphical representation of the second hypervolume;

determining an intersection of the first graphical representation and the second graphical representation, wherein the intersection comprises a first variable of the first rule and a first variable of the second rule, and wherein the first variable of the first rule is a same variable as the first variable of the second rule; and combining, based on the intersection of the first hypervolume and the second hypervolume the first rule and the second rule to generate a new individual rule.

6. The method of claim 5, further comprising:

determining, for each pair of rules in the set of rules, a respective pair overlap between calculated hypervolumes for each individual rule; and responsive to determining that a first pair overlap between a first pair of rules includes a highest count of same variables, combining the first rule and the second rule by:

combining respective sets of hypershapes associated with the first rule and the second rule in the first pair of rules.

7. The method of claim 6, further comprising:

determining, for each pair of rules, the respective pair overlap between hypervolumes by:

determining a respective Jaccard similarity for the respective sets of hypershapes associated with each pair of rules.

8. The method of claim 7, further comprising:

determining, for each pair of rules, the respective pair overlap between hypervolumes by:

determining, in a separate thread for each pair of rules, a Jaccard similarity for the respective sets of hypershapes associated with each pair of rule.

9. The method of claim 7, wherein iteratively combining pairs of rules in a set of rules further comprises:

sorting the respective Jaccard similarities for each pair of rules; and iteratively combining pairs of rules in order of their corresponding respective Jaccard similarities.

10. The method of claim 5, further comprising:

marking as non-modifiable hypershapes associated with the first rule, the second rule, and a subset of rules that neighbor the first rule and the second.

11. A non-transitory machine-readable storage medium for hierarchical rule clustering, encoded with machine-readable instructions executable by a physical processor that cause a system to:

determine one or more sets of hypershapes associated with a first rule and a second rule;

calculate, based on the one or more sets of hypershapes, a respective hypervolume for each set of hypershapes associated with each rule;

generating a graphical representation of each respective hypervolume; and generating a new individual rule based on an intersection of one or more graphical representations of each respective hypervolume, wherein the intersection includes a variable of the first rule and a variable of the second rule, and wherein the variable of the first rule is a same variable as the variable of the second rule.

12. The non-transitory machine readable storage medium of claim 11, further comprising machine readable instructions that cause the system to:

determine an intersection between hypervolumes by:

determining a respective Jaccard similarity for the respective sets of hypershapes associated with each rule; and combining respective sets of hypershapes associated with the first rule and the second rule.

* * * * *